United States Patent
Brevoort et al.

(10) Patent No.: US 11,863,602 B2
(45) Date of Patent: Jan. 2, 2024

(54) INTER-APPLICATION DATA INTERCHANGE VIA A GROUP-BASED COMMUNICATION SYSTEM THAT TRIGGERS USER INTERVENTION

(71) Applicant: Slack Technologies, Inc., San Francisco, CA (US)

(72) Inventors: Michael Brevoort, Littleton, CO (US); Ilan Frank, Los Altos, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/246,024

(22) Filed: Apr. 30, 2021

(65) Prior Publication Data
US 2022/0060523 A1 Feb. 24, 2022

Related U.S. Application Data

(60) Provisional application No. 63/067,810, filed on Aug. 19, 2020.

(51) Int. Cl.
*H04L 65/403* (2022.01)
*H04L 9/40* (2022.01)
(Continued)

(52) U.S. Cl.
CPC ....... *H04L 65/403* (2013.01); *G06Q 10/0633* (2013.01); *G06Q 50/30* (2013.01); *H04L 63/10* (2013.01)

(58) Field of Classification Search
CPC ... H04L 65/403; H04L 63/10; G06Q 10/0633; G06Q 50/30
See application file for complete search history.

(56) References Cited

U.S. PATENT DOCUMENTS

| | | | |
|---|---|---|---|
| 6,684,191 B1 * | 1/2004 | Barnard | G06Q 10/06 705/7.22 |
| 2002/0019797 A1 * | 2/2002 | Stewart | G06Q 30/06 705/37 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — William G Trost, IV
*Assistant Examiner* — Adam A Cooney
(74) *Attorney, Agent, or Firm* — Lee & Hayes, P.C.

(57) ABSTRACT

A communication platform can leverage a network-based computing system to enable applications to exchange data with one or more applications via channels. In some examples, a first application may post messages to the channel and a second application may listen to the posted messages to identify an event based on one or more of the messages. Responsive to detecting an event, the second application may notify a user, create a new channel, add a user to a channel, or the like, and/or the second application may take an action to remediate an issue. The first application and the second application and users added to the channel may be associated with a same or different organizations.

20 Claims, 5 Drawing Sheets

(51) Int. Cl.
G06Q 10/0633 (2023.01)
G06Q 50/30 (2012.01)

(56) References Cited

U.S. PATENT DOCUMENTS

| | | | | |
|---|---|---|---|---|
| 2002/0111922 | A1* | 8/2002 | Young | G06Q 10/10 |
| | | | | 705/80 |
| 2005/0027811 | A1* | 2/2005 | Kraft | G06Q 40/04 |
| | | | | 709/224 |
| 2008/0071817 | A1* | 3/2008 | Gaurav | H04L 67/56 |
| 2011/0093401 | A1* | 4/2011 | Waite | G06Q 30/06 |
| | | | | 705/303 |
| 2011/0208610 | A1* | 8/2011 | Halverson | G06Q 30/0641 |
| | | | | 705/26.1 |
| 2012/0096041 | A1* | 4/2012 | Rao | G06F 16/9535 |
| | | | | 707/E17.098 |
| 2013/0006816 | A1 | 1/2013 | Nuzzi et al. | |
| 2013/0226318 | A1* | 8/2013 | Procyk | G06Q 10/06 |
| | | | | 700/33 |
| 2013/0275475 | A1* | 10/2013 | Ahlborn | G06Q 10/0633 |
| | | | | 707/812 |
| 2016/0284031 | A1* | 9/2016 | Quon | H04L 65/403 |
| 2017/0004012 | A1* | 1/2017 | Brown | G06F 17/40 |
| 2017/0178224 | A1* | 6/2017 | Hurley | H04L 51/216 |
| 2017/0255965 | A1 | 9/2017 | Deluca et al. | |
| 2017/0262873 | A1 | 9/2017 | Atchley et al. | |
| 2018/0211259 | A1 | 7/2018 | Vu et al. | |
| 2018/0287982 | A1 | 10/2018 | Draeger et al. | |
| 2020/0059375 | A1* | 2/2020 | Hewitt | G06F 40/30 |
| 2020/0160464 | A1* | 5/2020 | Wewalaarachchi | |
| | | | | G06Q 30/012 |
| 2020/0387550 | A1* | 12/2020 | Cappetta | H04L 51/02 |
| 2021/0311785 | A1* | 10/2021 | Castinado | G06F 9/5005 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516> (dated Aug. 14, 2013, 4:15 PM) 3 pages.

Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—a New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

The International Search Report and Written Opinion for PCT Application No. PCT/US21/46718, dated Nov. 4, 2021.

* cited by examiner

INTER-APPLICATION DATA INTERCHANGE VIA A GROUP-BASED COMMUNICATION SYSTEM THAT TRIGGERS USER INTERVENTION

RELATED APPLICATION

This non-provisional application claims the benefit of priority of U.S. Provisional Patent Application No. 63/067,810, filed Aug. 19, 2020, which is incorporated herein, in its entirety, by reference for all purposes.

TECHNICAL FIELD

Electronic data interchange (EDI) systems may facilitate business-to-business communication or inter-business communication via direct communication lines using EDI hardware and communication standards. However, EDI standards change frequently and a multitude of EDI standards exist, meaning a company may set up an EDI system for communicating with the EDI system of a partner business, only to find that the EDI system doesn't work with the EDI system of a different partner business. Thus, EDI systems may be limited to certain specialized situations involving relatively stable and consistent standards and/or performing functions that are relatively well-defined and predicable.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2 also includes an example user interface associated with the interchange between the applications.

DETAILED DESCRIPTION

Figure 1:
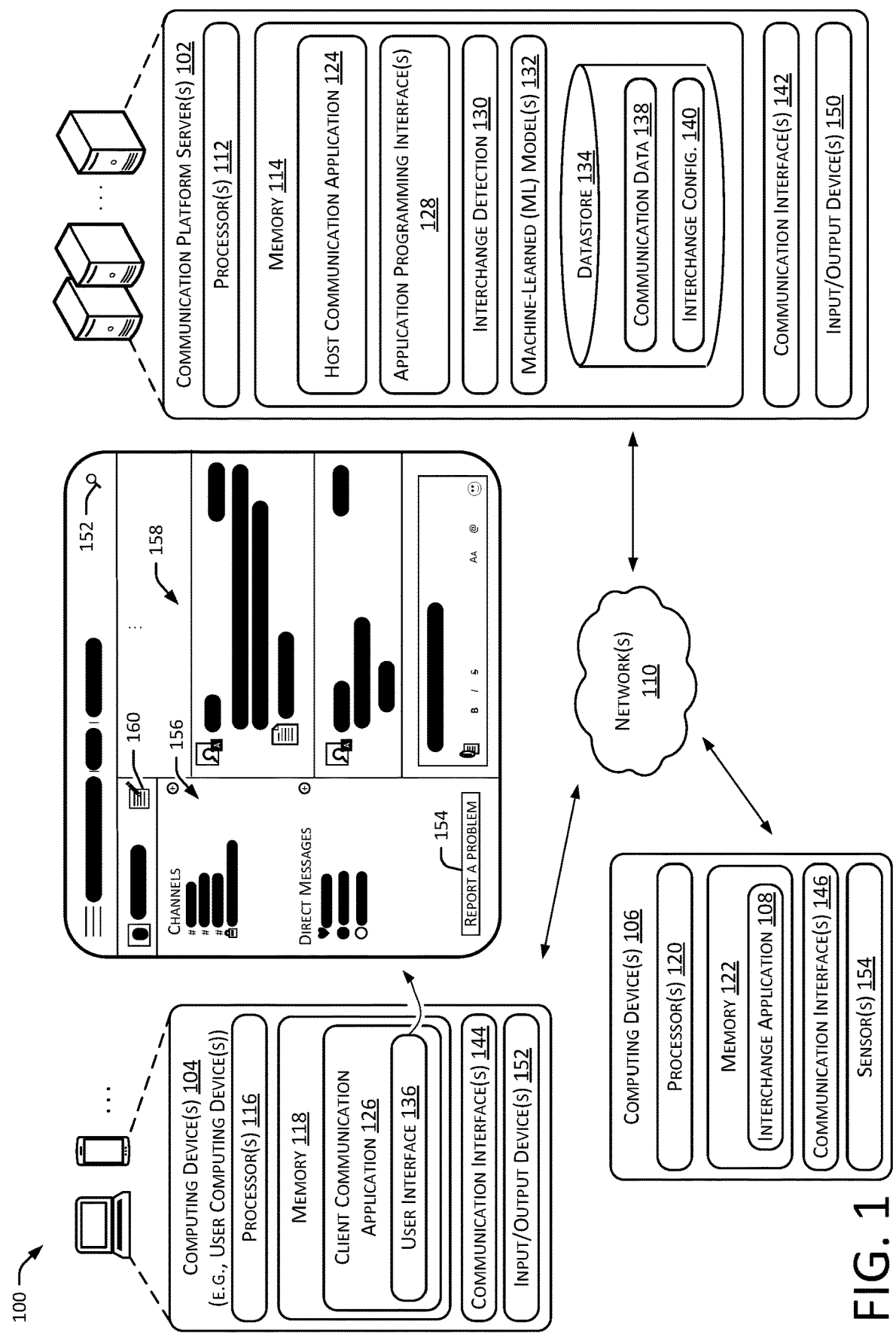
FIG. 1 illustrates an example environment and system infrastructure of a group-based communication system, in accordance with some embodiments of the present disclosure.

A communication platform can leverage a network-based computing system to enable users and applications to exchange data with one or more other users and/or applications via communication channels (or "channels"). A channel, or other virtual space, can be a data route used for exchanging data between and among systems and devices associated with the communication platform. For example, a channel may be established between and among various user computing devices, allowing the user computing devices to communicate and share data between and among each other over one or more networks. That is, in some examples, the communication platform can be a group-based communication platform, a channel-based communication platform, a permission-based communication platform, a channel-based messaging platform, and/or any other platform and/or hub for facilitating communication between and among users. In some examples, data associated with a channel can be presented via a user interface. In some examples, the user interface can present a data feed indicating messages posted to and/or actions taken with respect to a particular channel.

The techniques discussed herein may comprise an interchange channel for data interchange between applications associated with different organizations. Unlike electronic data interchange (EDI), however, the techniques may comprise triggering user involvement in data interchange using the group-based communication platform. For instance, in response to detecting an event, such as a message that satisfies a condition and/or parameter indicating an error, lack of information available to an application, or a happening that may positively or negatively impact a business, the techniques described herein may include inviting one or more users to join the interchange channel and/or creating a new channel and inviting the one or more users to join the new channel. In some examples, an interchange channel may be configured to include at least an application that posts message to a channel and an application that listens for events in the channel based on those posts. The listening channel may notify users, create channels, post messages, or the like based on events it detects. The techniques may comprise creating an interchange channel of the group-based communication platform that includes two or more applications that can be part of the interchange. For example, an administrator user (or other user) associated with a first organization registered with the group-based communication platform may set up a channel for the interchange. Setting up the interchange may comprise adding one or more applications associated with the first organization to the channel and one or more applications associated with a second organization different from the first organization to the channel. The process of adding the applications to the channel may be similar to adding a user to the channel of the group-based communication platform in some instances.

In at least one example, the user that sets up the interchange channel may purposefully leave users out of the channel (e.g., other than the applications added to the channel) and/or may set the interchange channel to be private. A private channel may have permissions associated therewith that prevents users of the group-based communication that are not associated with the private channel from discovering, joining, and/or seeing the contents of the private channel. In some examples, the interchange channel may be set up to include only the applications as members, in some instances, at least because the data being shared over that channel may be confidential, machine code, and/or very high volume. In some examples, a user may access and/or join the channel although, in some examples, the channel may be identified as an interchange channel which may have limitations on whether or how many users other than applications may join the channel.

In some examples, a first application that is part of the interchange channel may transmit a message over the interchange channel. This message may be received by the communication platform server(s) and may be routed to a second application that is part of the interchange channel. In some examples, the formatting for at least some of the messages sent in the interchange channel may be different from messages in other channels (e.g., user channels) of the communication platform. For example, the messages may comprise machine code and/or may be formatted according to a predetermine interchange formatting.

In at least one example, at least one application added to the channel may detect events for including a user in a channel, notifying a user, or otherwise drawing a user's attention or activating functionality of the group-based communication platform, as regards a user. For example, at least one application may transmit a message and one or more other applications may be listening to messages sent by the first application to detect event(s). A second application may detect an event based at least in part on content and/or metadata associated with the message sent by the first application and may cause one or more of the interchanged techniques discussed herein to be accomplished by the group-based communication platform.

For example, a first application may be associated with a first organization and may transmit messages over the interchange channel based at least in part on output of a computing device at the first organization, such as a sensor, manufacturing device, server, employee computing device, input device (e.g., a device that a user activates to indicate that a part/product is depleted or near depletion), or the like. A second application associated with a second organization may be part of the same interchange channel as the first application. In some examples, the second application may be part of the interchange channel to listen to the messages of the first application and detect an event based on one or more messages transmitted by the first application over the interchange channel. In some examples, the second application may additionally or alternatively transmit messages over the interchange channel, which may be received by the first application.

Upon detecting an event, the second application may cause one or more operations or actions by the group-based communication system. For example, the second application may transmit instructions to a server of the group-based communication system to invite a user to the interchange channel, open a new channel and invite a user to the new channel, transmit a message over the interchange channel (e.g., in a thread associated with the triggering message) and/or the second channel, cause execution of a workflow process associated with the group-based communication platform, send a direct message to the user, and/or notify the user. In examples in which the second application transmits a message, the message may comprise a link to the message sent by the first application that the second application detected as being associated with an event (the "triggering message"), an identifier of the message, a type of the event, content extracted from the triggering message, metadata extracted from the triggering message, an identifier of the first application, and/or data received responsive to a service made available by the first application.

In some examples, the group-based communication platform may receive an indication that the event is resolved and may close, lock, and/or archive the new channel (if one was opened) and/or remove the user from the interchange channel (if the user was added to the interchange channel). For example, the indication may comprise a reaction to a message sent in the new channel, a comment to a message send in the new channel, or any other indication.

The techniques described herein may reduce the hardware, software, and/or knowhow required for computing systems of two different organizations to accomplish data interchange. Moreover, the techniques discussed herein may have the added benefit of automatically adding a user to an interchange event using a group-based communication platform. The techniques may also reduce the complexity of, or translate content associated with, messages sent over the interchange channel so that the content is humanly understandable without familiarity with an EDI system or standard. Furthermore, adding the user to an interchange event in the group-based communication platform may reduce the amount of software the user needs to use and/or be familiar with to resolve interchange issues or issues indicated thereby since the user wouldn't need to use hardware and/or software specific to a particular EDI system and/or standard. The techniques may therefore reduce the amount of hardware and/or software required to accomplish data interchange, thereby increasing the available memory and/or computational cycles available and reducing power consumption. As such, systems structured in accordance with various embodiments of the disclosure provide specific, technical solutions to technical problems, the details of which are described herein.

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates a block diagram of an example system 100 of computing devices usable to implement example techniques described herein. In at least one example, the example system 100 can be associated with a group-based communication platform that can leverage a network-based computing system to enable users of the communication platform to exchange data. Such a group-based communication platform may comprise one or more computing devices performing services that are accessible to one or more client devices, and that are operable to provide access to a plurality of software applications related to operations of databases. In some examples, the group-based communication platform may take the form of one or more central servers disposed in communication with one or more additional servers running software applications and having access to one or more databases storing digital content items, application-related data, and/or the like. The group-based communication platform may also support client retention settings and other compliance aspects. Further, the group-based communication platform may provide comprehensive third-party developer support that grants appropriate access to the data and allows third parties to build applications and bots to integrate with user's workflows.

In at least one example, the communication platform can be "group-based" such that the platform, and associated systems, channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with one or more workspaces, enabling users associated with the group to chat, meet, call, collaborate, or otherwise communicate between or among each other in a secure and private virtual space. A particular group may be associated with a group identifier, which can be a workspace identifier or an organization identifier.

In some examples, the group-based communication platform is a channel-based messaging platform—in other words, channels of the communication platform may be central component of the manner of communicating and providing content via the communication platform. A channel may comprise a virtual communications environment or feed that is configured to display messaging communications posted by channel members (e.g., validated users accessing the environment using client devices) that are viewable only to the members of the channel. The format of the channel may appear differently to different members of the channel; however, the content of the channel (i.e., messaging communications) may be displayed to each member of the channel. For instance, a common set of group-based messaging communications may be displayed to each member of the respective channel such that the content of the channel (i.e., messaging communications) may not vary per member of the channel. A channel may be associated with a channel identifier that refers to or associates one or more items of data by which a channel may be uniquely identified. For example, a channel identifier may comprise ASCII text, a pointer, a memory address, and the like.

Some channels may be globally accessible to those users having a particular organizational group identifier associated with their user profile (i.e., users who are members of the organization). Access to some channels may be restricted to members of specified groups, whereby the channels are accessible to those users having a particular group identifier associated with their user profile. The channel identifier may be used to facilitate access control for a message (e.g., access to the message, such as having the message return as part of search results in response to a search query, may be restricted to those users having the channel identifier associated with their user profile, or who have the ability to join the channel) and/or to determine context for the message (e.g., a description of the channel, such as a description of a project discussed in the channel, may be associated with the channel identifier). In some examples, some channel(s) may be private such that access to such channels is restricted so that the channel(s) are not generally accessible and/or searchable by other members of the group-based communication system. For example, only those users and/or administrators whose user identifiers have been associated with a permission to access the channel may view, modify, etc. the private channel. To give access to such a channel, a channel identifier for the private channel may be associated with a user profile after the user has been validated/authenticated, allowing the user to view content of the private channel.

In some examples, members of a group, and thus workspace, can be associated with a same organization. In some examples, members of a group, and thus workspace, can be associated with different organizations (e.g., entities with different organization identifiers). The group may be defined by common access credentials such as those of an organization or commercial enterprise. Access may further be facilitated by a validated request to join or an invitation to join transmitted by one group member user to another non-member user. Group identifiers may be used to associate data, information, messages, etc., with specific groups. For example, a group identifier may comprise ASCII text, a pointer, a memory address, and the like. A group identifier may be used to facilitate access control for a message (e.g., access to the message, such as having the message return as part of search results in response to a search query, may be restricted to those users having the group identifier associated with their user profile) and/or may be used to determine context for the message (e.g., a description of the group, such as the name of an organization and/or a brief description of the organization, may be associated with the group identifier).

A user may include an entity such as an individual, group of individuals, business, organization, computing device, and/or the like. Users may access a group-based communication or messaging system using client devices.

FIG. 1 illustrates an example system 100 for a group-based communication platform, which may comprise example computing devices including communication platform server(s) 102 and one or more computing device(s) 104 associated with a first user, and/or one or more computing devices 106 associated with an interchange application 108, that interact over a network(s) 110. By way of example and not limitation, the communication platform server(s) 102 may be representative of servers used to implement a communication platform system, the computing device(s) 104 may be representative of user device(s) associated with a first user (i.e., a first "client device"). The computing device(s) 104 and/or 106 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (JOT) device, or any other computing device capable of sending communications and performing the functions according to the techniques described herein. In some examples, the computing device(s) 106 may comprise distributed computing devices, server(s), etc.

The communication platform server(s) 102 may comprise one or more individual servers or other computing devices that may be physically located in a single central location or may be distributed at multiple different locations. The communication platform server(s) 102 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In some examples, the computing device(s) 106 may comprise one or more computing devices that host an interchange application 108. The application may be a cloud-based service, a bot, a machine-learned model, hardware, and/or one or more software programs.

The network(s) 110 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, cellular network, or any other such network, or any combination thereof. The network(s) 110 may comprise a single network or collection of networks, such as the Internet, a corporate intranet, a virtual private network (VPN), a local area network (LAN), personal area network (PAN), metropolitan area network (MAN), a wireless local area network (WLAN), a cellular network, a wide area network (WAN), a metropolitan area network (MAN), or a combination of two or more such networks, over which the user computing device(s) 104 may access the communication platform and/or communicate with other user computing device(s) via the communication platform. Components used for such communications can depend at least in part upon the type of network, the environment selected, or both. Further, the communications network 110 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

Each of the computing devices described herein may include one or more processors and/or memory. Specifically, in the illustrated example, communication platform server(s) 102 include one or more processors 112 and memory 114, computing device(s) 104 include one or more processors 116 and memory 118, and computing device(s) 107 include one or more processors 120 and memory 122.

By way of example and not limitation, the processor(s) 112, 116, and/or 120 may comprise one or more central processing units (CPUs), graphics processing units (GPUs), field-programmable gate arrays (FPGAs), and/or process-acceleration devices such as application-specific integrated circuits (ASICs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 114, 118, and/or 120 may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/flash-type memory, or any other type of memory capable of storing information. The architectures, systems, and individual elements described herein may include many other logical, programmatic, and physical components, of which those shown in the accompanying figures are merely examples that are related to the discussion herein. The memory 114, 118, and/or 120 can be used to store any number of functional components that are executable by the processor(s) 112, 116, and/or 120, respectively. In many implementations, these functional components comprise instructions or programs that are executable by the processor(s) 112, 116, and/or 120 and that, when executed, specifically configure the processor(s) 112, 116, and/or 120 to perform the actions attributed to the communication platform server(s) 102, computing device(s) 104, and/or computing device(s) 106, according to the discussion herein.

As shown in FIG. 1, communication platform server(s) 102 may include a host communication application 124 and computing device(s) 104 may include client communication application 126 that enables interaction of content via the communication platform server(s) 102 among one or more computing devices associated via the communication platform. For example, content (e.g., messages including text, images, audio, video, etc.) can be shared among users associated with user accounts of an online communication network provided by the communication platform system and may include sharing content in accordance with a user account that is restricted, such as based on a type of account; an organization associated with the user/an organization account that has authorized access of the communication platform via the organization's account; a workspace that the user has joined or to which the user was added, or the like. In some examples, the client communication application 126 enables interfaces to access content, to view content, and to generate content as those described with reference to FIGS. 2-5B for example. In particular examples, communication platform server(s) 102 may send instructions to present, transmit, and receive content and/or instructions as discussed with reference to FIGS. 2-5B. In some examples, the communication platform server(s) 102 may expose interface options that are unique to the techniques discussed herein and, in some cases, may not be otherwise available to a user, although, in other examples, the user may access the interface options through a traditional manner of using the communication platform.

In some examples, the communication platform can be a channel-based messaging platform, that in some examples, can be usable by group(s) of users. Users of the communication platform can communicate with other users via channels. A channel, or virtual space, can be a data route used for exchanging data between and among systems and devices associated with the communication platform. In at least one example, the host communication application 124 can establish a channel between and among various user computing devices, allowing the user computing devices to communicate and share data between and among each other, and/or the host communication application 124 may establish a channel between one or more applications like interchange application 108. A communication between interchange applications may be the same as another other channel of the communication platform although, in some cases, the interchange channel may have special permissions or different configuration options associated therewith. In at least one example, the host communication application 124, and/or client communication application 126 can manage such communications and/or sharing of data. In some examples, data associated with a channel can be presented via a user interface. In at least one example, the host communication application 124 can interact with the computing device(s) 104 via one or more application programing interfaces (API(s)) 128 to manage the generation, presentation, and/or updating of user interfaces.

In at least one example, the host communication application 124, client communication application 126, and/or interchange application 108 can be a mobile application, a web application, a database interface (e.g., such as an application that presents a SQL or other database interface), or a desktop application, which can be provided by the communication platform or which can be an otherwise dedicated application. For example, a computing device of the one or more computing device(s) 104 and/or computing device(s) 106 may access the host communication application 124 via a web browser that communicates via network(s) 110 with API(s) 128. In some examples, computing device(s) 104 associated with the example system 100 can have an instance or versioned instance of the client communication application 126, which can be downloaded from an application store, accessible via the Internet, or otherwise executable by the processor(s) 116 to perform operations as described herein. In other words, the client communication application 126 can be an access point, enabling the user computing device(s) 104 to interact with the communication platform server(s) 102 to access and/or use communication services available via the communication platform, such as accessing the host communication application 124, interchange detection component 130, machine-learned (ML) model(s) 132 (which may be part of interchange detection component 130, and/or datastore 134 via the API(s) 128. In at least one example, the client communication application 126 can facilitate the exchange of data between and among various other user computing devices, for example via the communication platform server(s) 102. In at least one example, the client communication application 126 may comprise instructions for causing presentation of a user interface 136, which may comprise visual, audible, and/or tactile features. A non-limiting visual representation of a general user interface 136 is illustrated in FIG. 1.

In some examples, the host communication application 124 may differ from the client communication application 126 by including or accessing one or more application programming interface(s) (API(s)) 128 for exposing back-end functions offered by the communication platform server(s) 102 to the computing device(s) 104 without transferring the functions to the computing device(s) 104 and/or accomplishing the functions at the communication platform server(s) 102. As relates to the instant discussion, this may comprise API(s) for receiving communication data from the computing device(s) 104, such as a message or any of the communication data discussed herein, and determining an embedding, identifying one or more nearest neighbors based at least in part on the techniques discussed herein, and returning an indication of one or more communication platform features or instructions associated therewith (e.g., instructions to cause a user interface 136 associated with the client communication application 126 to display an option to populate a channel or user identifier for the message that triggered the API call). For example, interchange data, interchange channel configurations, and/or instructions generated based at least in part on detecting an event in an interchange channel may be exchanged via the API(s) 128, according to the examples discussed herein.

In some examples, the client communication application 126 may be configured to authenticate a user to access data associated with the communication platform server(s) and a user profile. The user profile may be stored at the computing device(s) 104 and/or at the communication platform server(s) 102. A user profile may additionally be referred to herein as a "user account" and/or "user account details," refer to data and/or a data structure associated with a user, including, for example, a user identifier, one or more group-based communication channel identifiers associated with channels that the user has been granted access to, one or more group identifiers for groups with which the user is associated, an indication as to whether the user is an owner or an administrator of any channels, an indication as to whether the user has any channel restrictions, user preferences, a plurality of messages, a plurality of emojis, a plurality of conversations, a plurality of conversation topics, an avatar, an email address, a real name (e.g., John Doe), a username (e.g., jdoe), a password, a real name, a time zone, a status, a historical typing pattern associated with a user's historical typing features, a historical average typing speed associated with a user, a historical recipient list associated with historical messages or content transmitted by a client device associated with a user, a historical average download/upload data rate for the attachments associated with historical messages performed by a client device associated with a user, a historical search term list associated with a user, a historical message content retrieval or exportation rate associated with a user, a historical public or private network access record associated with a user, a historical VPN access record associated with a user, biometric data (e.g., fingerprint data, visual recognition data, facial recognition data, audio recognition data, etc.) associated with a user, and the like. The user account details can include a subset designation of user credentials, such as, for example, login information for the user including the user's username and password. In some examples, any portion or the entirety of the user profile or one or more items of data with which the user profile is associated may be referenced by a user identifier, which may comprise ASCII text, a pointer, a memory address, and the like.

FIG. 1 further illustrates communication platform server(s) 102 as including an interchange detection component 130 and machine-learned (ML) model(s) 132, which may carry out at least some of the operations discussed herein. In some examples, the interchange detection component 130 may comprise one or more ML models. In at least one example, the ML model(s) 132 may additionally or alternatively be stored in memory 114 of the computing device(s) 104. The communication platform server(s) 102 may additionally or alternatively include or have access to datastore 134. In at least one example, a datastore 134 can be configured to store data that is accessible, manageable, and updatable, such as communication data 138 (at least part of which may comprise communication data transmitted in an interchange channel) and/or interchange configuration(s) 140 generated according to the techniques discussed herein.

In some instances, ML model(s) 132 may comprise one or more neural network layers that are learned jointly with a neural network model, Word2Vec, GloVe, t-distributed stochastic neighbor embedding (t-SNE), and/or the like and/or a clustering algorithm, such as k-means clustering, density-based spatial clustering of applications with noise (DBSCAN), HDBSCAN, mean-shift clustering, expectation-maximization (EM) clustering, etc. In some examples, the clustering algorithm may differ depending on the communication data type (e.g., message, file, reaction, search query). In some examples, an ML model discussed herein may be initially fit or trained on a training dataset (e.g., a set of examples associated with a positive event detection of a first type in an interchange channel, a positive event detection of a second type, etc., and/or examples of non-events). In some examples, the ML model(s) may additionally or alternatively comprise a learned tree or other ML model structure for deciding whether a message transmitted over an interchange channel is associated with an event or not. In some examples, the ML model(s) 132 may comprise different ML models for different event types.

The ML model may be trained on the training dataset using supervised, semi-supervised, or unsupervised learning. In at least one example, the training dataset used herein may comprise semi-supervised or supervised labels of a message being associated with an event or not. The ML model may be run with the training dataset and produces a result, which is then compared with a target, for each input vector in the training dataset. Based on the result of the comparison and the specific learning algorithm being used, the parameters of the model may be adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network).

Communication data 138 may be used to semi-supervise training of some of the models discussed herein in some examples. For example, user input that classifies or implicitly classifies or assigns a value to data may be used as part of training data for the models discussed herein. For example, a supervision label indicating that a message is associated with an event may be inferred based at least in part on a user reaction to a message; a user that opens a ticket based at least in part on the message; opening a thread associated with the message; attaching the message to another message; identifying, in another channel or message, the message sent in the interchange channel, etc. Semi-supervised input from a user may additionally or alternatively comprise an image label, moderation operations (e.g., moving a conversation, message, user, etc. from one channel to a different channel; merging two channels; splitting a channel into two channels; opening/closing a channel), opening a ticket, reacting to a message, etc.

In at least one example, when an interchange channel is created, interchange configuration 140 may be associated with the interchange channel and data transmitted via the interchange channel may be part of the communication data 138 stored in datastore 134 (and/or locally at other device(s)). The interchange configuration 140 may specify a set of permissions associated with the interchange channel, such as whether non-application users are permitted to join the channel, whether a non-application user may add another non-application user to the channel (when the non-application user is not an administrator, for example), and rules defining which users may modify events that the interchange detection component 130 is configured to detect for a particular channel. In some examples, the interchange configuration 140 may identify a black list, white list, and/or permission limits of in-organization or out-of-organization applications that are permitted to be added to an interchange configuration. An in-organization application may refer to an application that was developed by or otherwise associated with a first organization and an out-of-organization application may be an application that was developed by or otherwise associated with a second organization different from the first organization. For example, interchange application 108 may be an example of either an in-organization application or an out-of-organization application.

The datastore 134 may comprise a database such as an electronic repository used to store a collection of information, data, datasets, data objects, or data corpora that is organized and easily accessible for rapid search and retrieval. The datastore 134 may comprise a network database a database connected to a communications network that, upon receiving a query from network-connected computing devices, allows data stored in the network database to be transmitted, received, and/or retrieved in response to the query. It will be appreciated that the terms "datastore," "database," "repository," and "network database" may be used interchangeably in areas of the present disclosure.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. Moreover, data may be transmitted, received, or otherwise exchanged as individual "data objects" comprising interrelated data. Data objects may constitute single bits of data or large quantities of interrelated data, such as substantive data (e.g., the underlying content to be conveyed through a communication) and associated metadata (e.g., data not otherwise considered to be substantive data, encompassing characteristics of the substantive data and/or the relevant exchange (e.g., the identity of the user sending the data, the identity of the user receiving the data, the time/date when the data was sent, formatting to be associated with the exchanged substantive data, the file type of the data object, and/or the like).

In some examples, any content or communications that are transmitted via the communication platform may be stored in datastore 134 until deletion therefrom. In some examples, the datastore 134 can be integrated with the communication platform server(s) 102, as shown in FIG. 1. In other examples, the datastore 134 can be located remotely from the communication platform server(s) 102 and can be accessible to the communication platform server(s) 102 and/or user device(s), such as the user computing device(s) 104. The datastore 134 may comprise multiple databases, which can include communication data 138 and/or interchange configuration(s) 140.

Communication data 138 may include a message, query, file (e.g., document, spreadsheet, computer code, image, video, audio, electronic contact information), mention, user or user profile, interaction (e.g., reaction, edit, deletion, prioritization such as by pinning or starring), ticket, channel, application integrated into one or more channels, conversation (e.g., group of messages that has been segmented as a single unit), workspace (e.g., a set of channels, users, projects, tasks within an organization that may have its own set of permissions; may be organized substantially in line with an organization chart in some instances), etc. that are associated with an organization's transmissions using the communication platform. Creation, selection, uploading, and/or downloading of such communication data 138 at the computing device(s) 104 may be part of the interaction activity discussed herein.

In some examples, a query may comprise computer-executable instructions forming a request associated with a database. A query may be generated on one or more client devices via the client communication application 126, and may be transmitted to a group-based communication platform. A query may be a select query, which may be used to extract data from the database in a readable format according to the query. A query may be an action query, which may comprise a request to accomplish an operation such as insertion, deletion, and/or updating on the data stored in the datastore 134. A query may be a search query, or a search query request, which is received from a client device associated with a particular user requesting for operating a search function on a database to retrieve communication data 138.

A message may comprise any electronically generated digital content object provided by a user using a client device in association with the client communication application 126, host communication application 124, and/or interchange application 108 and that is configured for reproduction via an instance of the client communication application 126, e.g., served in association with a channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a channel of the group-based communication system (i.e., the channel may be a group-based channel) includes metadata comprising the following: a sending user identifier, a message identifier, message contents, a group identifier, and a channel identifier. Each of the foregoing identifiers may comprise ASCII text, a pointer, a memory address, and the like.

In one implementation, the message may include data such as a message identifier, sending user identifier, a group identifier, a channel identifier, message contents (e.g., text, emojis, images, links), attachments (e.g., files), message hierarchy data (e.g., the message may be a reply to another message), third party metadata, and/or the like.

In some examples, messages sent by interchange application 108 over an interchange channel may have a formatting that is different than messages sent in other channels. For example, a message sent by interchange application 108 over an interchange channel may comprise an interchange format that is unique to the communication platform server(s) 102, a translation of an EDI standard into a common standard, and/or a format that conforms to an EDI standard (e.g., ANSI X12, UN/EDIFACT, or an industry-specific standard, such as HIPAA).

In some embodiments, a group identifier as defined above may be associated with the message. In some examples, a channel identifier as defined above may be associated with the message. In some embodiments, a sending user identifier as defined above may be associated with the message. In one implementation, the message may be parsed (e.g., using PHP commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message. In some examples, messages associated with a same user identifier may be retrieved and one or more topics may be determined based at least in part on the retrieved messages. These one or more topics may be associated with the message(s) and/or the user profile associated with the user identifier.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the channel in response to the message), downloading a file associated with the message, sharing the message from one channel to another channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic and/or based at least in part on retrieving messages associated with a user identifier associated with the user and determining context from the retrieved messages).

In some examples, message user interfaces, such as attachments, may be included within the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some examples, third party metadata may be associated with the message. For example, third party metadata may provide additional context regarding the message or the user that is specific to a company, group, channel, and/or the like. In one implementation, the message may be parsed (e.g., using PHP commands) to determine third party metadata. For example, third party metadata may indicate whether the user who sent the message is an authorized representative of the channel (e.g., an authorized representative may be authorized by the company to respond to questions in the channel).

In some examples, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In some examples, various metadata, determined as described above, and/or the contents of the message may be used to index the message (e.g., using the conversation primitive) to facilitate various facets of searching (i.e., search queries that return results from group-based communication datastore 134). In one implementation, a storage message may be sent from communication platform server 102 to facilitate indexing in group-based communication datastore 134. In another implementation, metadata associated with the message may be determined and the message may be indexed in group-based communication datastore 134. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

In some examples, the communication platform server(s) 102 may create a storage message based at least in part upon receiving a message to facilitate message storage in one or more databases, such as datastore 134. In one implementation, the storage message may include data such as a message identifier, a group identifier, a channel identifier, a sending user identifier, topics, responses, message contents, attachments, message hierarchy data, third party metadata, conversation primitive data, and/or the like.

In some examples, the datastore 134 may additionally or alternatively store permissions data associated with permissions of individual users of the communication platform and/or applications, such as interchange application 108. In some examples, permissions can be set by the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

The datastore 134 may additionally or alternatively store workspace data, which may be part of the communication data 138. In at least one example, the communication platform can be partitioned into different workspaces, which can be associated with different groups of users. Each workspace can be associated with a group identifier and one or more user identifiers can be mapped to, or otherwise associated with, the group identifier. User(s) corresponding to such user identifier(s) can be "members" of the group. A workspace may comprise one or more channels that are unique to that workspace and/or one or more channels that are shared between one or more workspaces. In some examples, workspaces can be associated with one or more organization identifiers, which can be associated with organizations or other entities associated with the communication platform. In some examples, such data can be mapped to, or otherwise associated with, other types of data in the datastore 134 (e.g., user data, permission data, channel data).

The datastore 134 may additionally or alternatively store channel data, which can be part of communication data 138. Channel data may store data associated with individual channels. In at least one example, the host communication application can establish a channel between and among various user computing devices, allowing the user computing devices to communicate and share data between and among each other. In at least one example, a channel identification may be assigned to a channel, which indicates the physical address in the datastore 134 where data related to that channel is stored. A channel may be "public," which may allow any user within an organization (e.g., associated with an organization identifier) to join and participate in the data sharing through the channel, or a channel may be "private," which may restrict data communications in the channel to certain users or users having particular roles (e.g., managers, administrators). In some examples, a channel may be "shared," which may allow users associated with different organizations (e.g., entities associated with different organization identifiers) to join and participate in the data sharing through the channel. Shared channels may be public such that they are accessible to any user of either organization, or they may be private such that they are restricted to access by certain users or users having particular roles from both organizations. In some embodiments, each organization may set different policies for data access and retention for its data in the shared channel. In some examples, there may be channel configuration options that are unique to interchange applications, such as the ability to prevent users from joining the channel unless they are invited by an interchange application 108 or unless the user has elevated privileges (e.g., the user set up the interchange channel, the user has administrator privileges).

In some examples, the datastore 134 may be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), channels, users, or the like. In some examples, data shards can improve the performance of the communication platform.

In some examples, individual organizations can be associated with a database shard within the datastore 134 that stores data related to a particular organization identification. For example, a database shard may store electronic communication data associated with members of a particular organization (i.e., communication data 138), which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, a channel can be associated with a database shard within the datastore 134 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored. In some examples, an interchange channel may be associated with a database shard.

In some examples, the communication platform server(s) 102 may include communication interface(s) 142, computing device(s) 104 may include communication interface(s) 144, and/or computing device(s) 106 may include communication interface(s) 146. Communication interface(s) 142, 144, and/or 146 may include one or more physical and/or logical interfaces, such as hardware and/or software components, for enabling communication with various other devices, such as over the network(s) 110 or directly. In some examples, the communication interface(s) 142, 144, and/or 146 can facilitate communication via Websockets, Application Programming Interfaces (APIs) (e.g., using API calls), HyperText Transfer Protocols (HTTPs), etc. Additionally or alternatively the communication interface(s) 142, 144, and/or 146 may enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with other computing device(s).

The communication platform server(s) 102 may further include input/output (I/O) device(s) 150 and/computing device(s) 104 may include I/O device(s) 152. Such I/O devices 150 and/or 152 can include a display, various user interface controls (e.g., buttons, a touch screen, keyboard, mouse, touch screen, joystick), audio speakers, connection ports, haptic or other tactile output devices, and so forth.

In some examples, the computing device(s) 106 may comprise or receive sensor data from one or more sensors 154. For example, sensor(s) 154 may comprise software and/or hardware, such as a camera, global positioning system, barcode scanner, security system sensors, pressure sensor, or any other sensor. The sensor(s) 154 may provide an indication that a drawer of parts is or is nearly empty, a server or sensor is up/down, a package has been shipped and/or a location of the package, a person has badged into a secured area, biometric data associated with an authentication or record, etc. In some examples, the interchange application 108 may transmit messages via the interchange channel that are generated based at least in part on sensor data output received by the computing device(s) 106 from sensor(s) 154.

As illustrated in FIG. 1, the user interface 136 may present data associated with one or more channels and, in some examples, one or more workspaces. That is, in some examples, the user interface can expose features from multiple channels, workspaces, users, and/or applications into a single user interface so that the user (e.g., of the user computing device 104) can access and/or interact with these different features and/or communicate with other users associated with the different features. In some examples, the user interface 136 may comprise a first region 156 of the interface that displays channels of which the user is a member and/or direct message sent to the user.

Additionally or alternatively, the user interface 136 may comprise a second region 158 of the user interface 136 that can be associated with a data feed (or, "feed") indicating messages posted to and/or actions taken with respect to one or more channels and/or other virtual spaces for facilitating communications (e.g., a virtual space associated with direct message communication(s), a virtual space associated with event(s) and/or action(s)). In some examples, the data feed can be organized and/or is sortable by workspace, time, type of action, channel, user, or the like. In some examples, such data can be associated with an indication of which user (e.g., member of the channel) posted the message and/or performed an action.

The user interface 136 may additionally or alternatively comprise an interface element (e.g., visual display element, such as a button) for drafting a message, i.e., element 160; creating a search query, i.e., element 162; etc. Note that, although these elements are depicted as visual elements, they may be selectable or interacted with via voice, touch, gaze, I/O device output, and/or other user interactions. The client communication application 126 may include instructions to display a message drafting interface, a search query interface, or a triage ticket interface upon selection of any of these interface elements. Interaction with any of these interfaces may create an API call that includes data that may be based at least in part on the interaction with the interface.

While FIG. 1 is provided as an example system 100 that can be used to implement techniques described herein, the techniques described and claimed are not limited to being performed by the system 100, nor is the system 100 limited to performing the techniques described herein. As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 2:
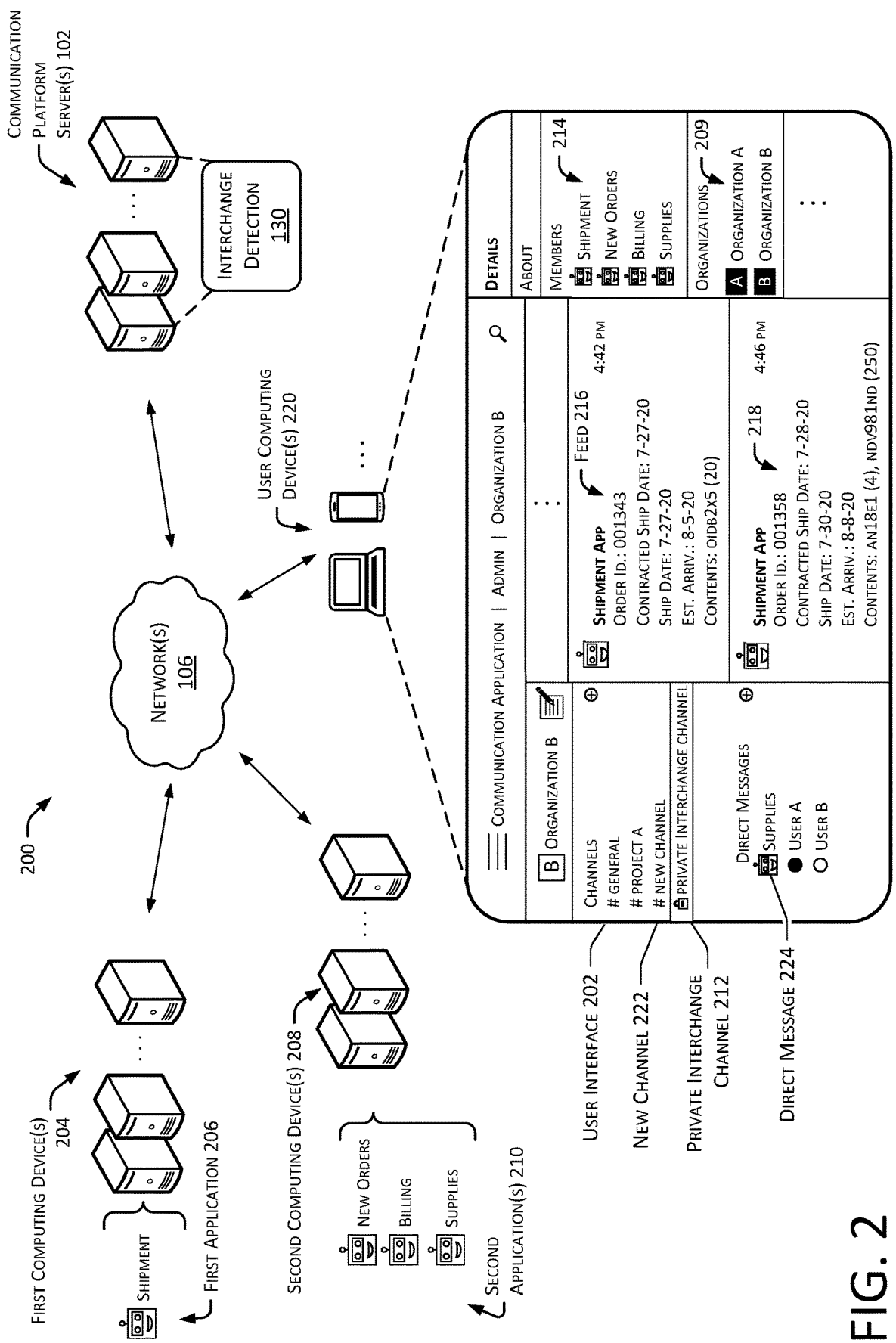
FIG. 2 illustrates an example group-based communication platform arrangement for automated interchange between applications of different organizations via a group-based communication platform that may trigger user intervention.

FIG. 2 illustrates an example arrangement 200 of a group-based communication system for automated interchange between applications of different organizations via a group-based communication platform that may trigger user intervention and an example user interface 202 that is more specific to such interchange.

The example arrangement includes at least computing device(s) 204 that may be associated with a first organization and/or a first application 206 and computing device(s) 208 that may be associated with a second organization and/or second application(s) 210. Although FIG. 2 depicts multiple applications associated with the second organization and a single application associated with the first organization, any number of applications may be used. In the depicted example, the first application 206 is an application that transmits messages based at least in part on order fulfillment and/or shipping. For the sake of example, a user associated with the second organization may add the first application 206 and the second application(s) 210 to an interchange channel. The interchange channel may be managed by the second organization although, in some examples, the first organization may have limited or equal controls over the interchange channel. For example, the first organization may be able to, at least, retract the ability for the first application to be added to additional channels, retract the first application's participation in existing channels, restrict the first application to being used in interchange channels only, or the like. The user interface 202 depicts the organizations that can access the channel at sub-portion 209 of the user interface 202 in an example where different organizations and/or user(s) and/or application(s) of the different organizations are permitted to access the channel. Note that, although FIG. 2 depicts two organizations, "Organization A" and "Organization B," any number of organizations may be permitted access to the channel as defined by the interchange configuration 140.

In some examples, the second application(s) 210 and/or an interchange detection component 130 of the group-based communication platform may receive messages sent by the first application 206 and may be configured to detect one or more types of events based at least in part on a message sent by the first application 206. In the depicted example, the second application(s) 210 comprise a new orders application, a billing application, and a supplies application. Any of the applications may be configured to detect event(s) based on messages sent by the first application 206, which may be the same or different types of events. For example, the new order application may be configured to detect whether there were any problems with new orders being opened with the first organization, the billing application may be configured to detect when a bill has been accrued or failed to be billed, and the supplies application may detect when there may be a high likelihood that a team on the second organization will run out of supplies before an order arrives. A problem with an order may be detected in different ways by any of those three applications but the applications may be configured to take different actions based on the events and their implications.

For example, if an order failed to be received by the first organization, the new orders application may create a new shared channel with the first organization to coordinate and/or monitor the status of the order or to attempt to re-order; the billing application may take no action or may transmit a direct message to a user associated with the second organization noting the potential delayed bill or may transmit a message in a finance-related channel noting the same; and the supplies application may transmit a message in a channel associated with a workspace or user that originated the order.

In an additional or alternate example, the communication platform server(s) 102 may comprise an interchange detection component 130 for detecting events. In some examples, the interchange detection component 130 may comprise a workflow that specifies conditions and/or parameters to detect based on message(s) sent by the first application 206 over the interchange channel and one or more actions to accomplish via the group-based communication platform based on satisfaction of the conditions and/or detection of the parameters.

FIG. 2 also illustrates an example user interface 202 in instances where an interchange channel may be made private 212 and/or where users are not allowed into interchange channels or where only an interchange application or administrator can add a user to the interchange channel. In some embodiments, a user is added to the interchange channel when human interaction is needed. For example, the list of members 214 of the interchange channel comprises only applications in the depicted example. In additional or alternate example, users may search for, discover, and/or see the content of the interchange channel.

The illustrated feed 216 comprises multiple messages sent by the first application 206 regarding various orders placed between the second organization and the first organization. In some examples, the techniques may comprise adding any number of "output" type applications that may output a status or other indication and "listener" applications configured to detect an event related to messages sent by an output application. In an additional or alternate example, at least some applications may be both output and listener applications. For example, the new orders application may both transmit a message to create an order, which the shipment application (or another application) may receive and process, and the new orders application may also listen for a message that confirms creation and/or fulfillment of the order or other events associated therewith. Note that message 218 indicates that an order was shipped later than the contracted date, which may be an event detected by any of the second application(s) 210. For example, the billing and/or supplies applications may both trigger actions at the group-based communication platform based at least in part on detecting that the actual ship date is later than the contracted ship date.

Note that, although the messages depicted in feed 216 are humanly comprehensible without significant prior knowledge, the message may additionally or alternatively comprise machine code and/or a message formatted according to an EDI standard. For example, a message related to shipment of an order may look like the following in an example that uses the ASC X12 standard.

Additionally or alternatively, the communication platform server(s) 102 may receive an EDI-formatted message and convert the message into a more user-friendly message, such as the messages depicted in FIG. 2. In such an instance, the communication platform server(s) 102 may retain the original message and/or attach the original message to the converted message.

In some examples, upon detecting an event, the interchange detection component 130 and/or one of the second application(s) 210 that detects an event may cause one or more actions via the group-based communication platform to loop-in a user associated with user computing device(s) 220 (e.g., such as by adding the user to an interchange channel, adding a user from another organization to the interchange channel, direct-messaging the user and/or an application). For example, the second application and/or the interchange detection component 130 may open a new channel 222 and add the user as a member of the new channel, directly message 224 the user, add the user to the interchange channel, mention the user, notify the user, and/or open a new thread associated with message 218 and mention the user. The action may additionally or alternatively comprise creating and/or transmitting a message that identifies the event type, the message(s) that triggered the event detection, potential solutions to the event, and/or the like in the new channel, direct message, thread, notification, etc.

Note that first computing device(s) 204 and/or second computing device(s) 208 may be examples of computing device(s) 106 and user computing device(s) 220 may be an example of computing device(s) 104.

Figure 3:
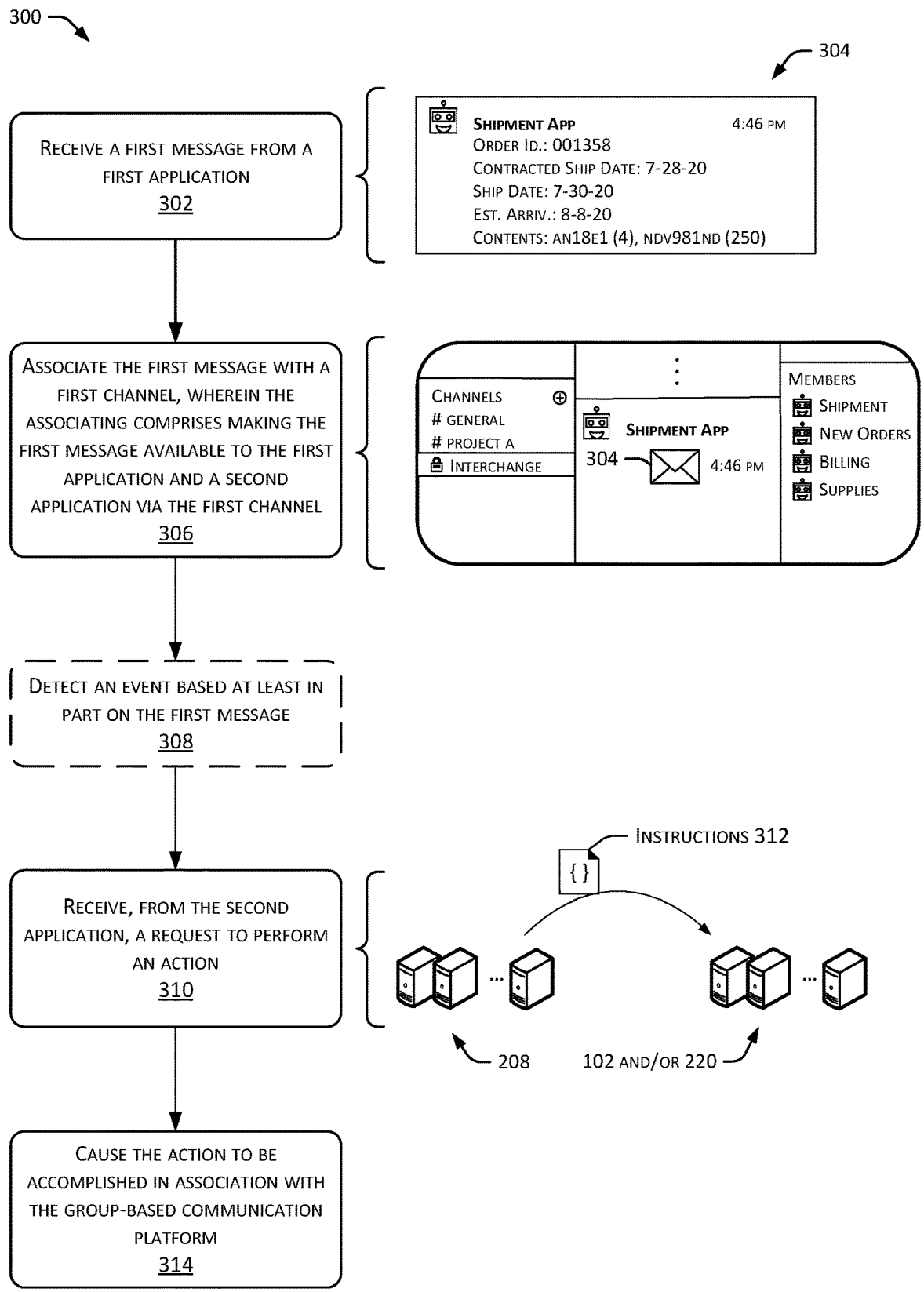
FIG. 3 illustrates a flow diagram of an example process for interchange between applications of different organizations and detection and methods for inviting a user to a channel.

FIG. 3 illustrates a flow diagram of an example process 300 for interchange between applications of different organizations in an interchange channel of a group-based communication platform and looping in a user upon detection of an event in the interchange channel, in accordance with some embodiments of the present disclosure.

At operation 302, example process 300 may comprise receiving a first message from a first application, according to any of the techniques discussed herein. The first application may be associated with a first organization. The message may comprise machine code, sensor data, and/or a message or contents from a message formatted according to an EDI format. FIG. 3 depicts an example message 304 in plain text without EDI formatting. In some examples, the first application may comprise hardware and/or software that provide a computational service, such as an indication that computer hardware is online or offline, an indication that a customer or employee is present or absent, an indication that more supplies will be needed soon, etc.

At operation 306, example process 300 may comprise associating the first message with a first channel, wherein the associating comprises making the first message available to the first application and a second application via the first channel (e.g, by setting permissions associated with the first message such that the first application and/or the second application can read, react to, and/or otherwise interact with the first message), according to any of the techniques discussed herein. In some examples, the channel may be an interchange channel that may have a configuration that may be the same or different as other channels associated with the group-based communication platform. For example, the interchange channel configuration may limit the amount which users can post in the channel, limit user input to reactions to messages, prevent users from joining the channel and yet being able to view the channel, allow an interchange application to add a user to the channel, or the like. In some examples, the first application and the second application may be associated with a same organization although, in additional or alternate examples, the second application may be associated with a second organization different from the first organization. In some examples, one or more applications associated with the first organization and one or more applications associated with the second organization may be added to an interchange channel.

At operation 308, example process 300 may comprise detecting an event based at least in part on the first message, according to any of the techniques discussed herein. In some examples, detecting the event may comprise providing the first message, part of the first message, metadata associated with the first message or the first application, and/or one or more other messages or content related thereto to an ML model as input. The ML model may be part of an interchange detection component or part of the second application. The ML model may be trained to binarily output an indication that the first message is or isn't related to a particular event, trained to output an indication that the first message is associated with one event among multiple possible events, and/or to output one or more scores indicating the likelihood that the first message is associated with one or more event types. Additionally or alternatively, detecting the event may comprise determining whether a matching algorithm score (e.g., a Munkres match score) meets or exceeds a threshold.

In some examples, operation 308 may comprise determining an event type and/or may trigger a workflow which may comprise one or more operations accomplished by the group-based communication platform. In some examples, the second application and/or the interchange detection component may comprise a ruleset defining the ML model to detect an event and the series of operations to conduct when an event is positively identified.

The event types may vary widely depending on the industry and type of application. For example, the first organization may be an automobile parts company and the second organization may be an automobile repair shop. In such an instance, the event type may comprise an order being delayed, part(s) being needed or needed soon, a shipment containing the wrong parts, a shipment arriving late, etc. In another example, the first organization may be an Internet service provider and the second organization may be any company that maintains a website to provide services or to publicize their company. In such an instance, the event type may comprise a server offline indication, a network metric indicator (e.g., ping exceeded for last x time period or number of pings, a bandwidth usage metric, a number of visitors to a webpage), an indication of malicious activity, identification of a maintenance window, a violation of a service-level agreement, a length of time for which a service-level agreement has been broken, etc.

Note that operation 308 is shown with a dashed line because, in some instances, one of the applications may do the detecting in addition or instead of the group-based communication platform. Although, in some examples, the group-based communication platform may be configured to do the detecting.

At operation 310, example process 300 may comprise receiving, from the second application and/or the interchange detection component, a request to perform an action based at least in part on the event, according to any of the techniques discussed herein. For example, the second application may, upon positive identification of an event, transmit instructions 312 from computing device(s) 208 to communication platform server(s) 102 and/or user computing device(s) 220. The group-based communication platform may determine if the request comports with the interchange channel configuration and cause an action to occur if the interchange channel configuration permits the action. In some examples, the interchange detection component may be located at communication platform server(s) 102 so the transmission of the instructions 312 may occur within the between component(s) of the communication platform server(s) 102.

At operation 314, example process 300 may comprise causing the action to be accomplished in association with the group-based communication platform, according to any of the techniques discussed herein. FIGS. 4A-5B depict example user interfaces that may result from execution of the action. The action may comprise, for example, inviting a user to the interchange channel, creating a new channel and inviting the user to the new channel, creating a thread associated with the first message, transmitting a direct message to a user, and/or transmitting a message in an existing channel. In at least one example, one or more users may be invited to the interchange channel. Any two users invited to the interchange channel may be associated with a same organization or different organizations. The action may additionally or alternatively include transmitting a message over any of the channels indicated above and mentioning a user, identifying the first message (e.g., providing a link to the first message, quoting the first message) and/or part of the content related thereto, identifying the type of event detected, identifying an application that detected the event, identifying the application associated with the message that triggered the event detection, identifying potential next actions, and/or presenting user interface elements selectable to cause further actions. For example, the further actions may comprise opening a draft direct message from the user to a user associated with the first organization, creating a new channel between the first organization and the second organization, adding another user to a channel and/or direct message, opening/closing a ticket, resolving the event (e.g., by reacting to a message or thread, archiving a channel), performing an action in a specified workflow, or the like.

In some examples, example process 300 may further comprise detecting that the event is resolved and causing a resolution activity, according to any of the examples discussed herein. For example, the resolution activity may comprise archiving a channel, removing a user from the interchange channel, notifying the user of their imminent removal and providing a time period to extend participation in the interchange channel or an option to indicate resolution has not been reached, or the like. In some examples, the resolution activity may comprise migrating at least some of the interchange applications from a first interchange channel into a second interchange channel or consolidating two interchange channels into a single interchange channel.

FIGS. 4A-5B illustrate different user interfaces that may result from instructions executed by various components of the group-based communication systems and may further explain underlying operations of those component(s). For example, the example user interfaces discussed herein may be a result of the instructions 312, the actions, and/or the resolution actions discussed above.

Figure 4A:
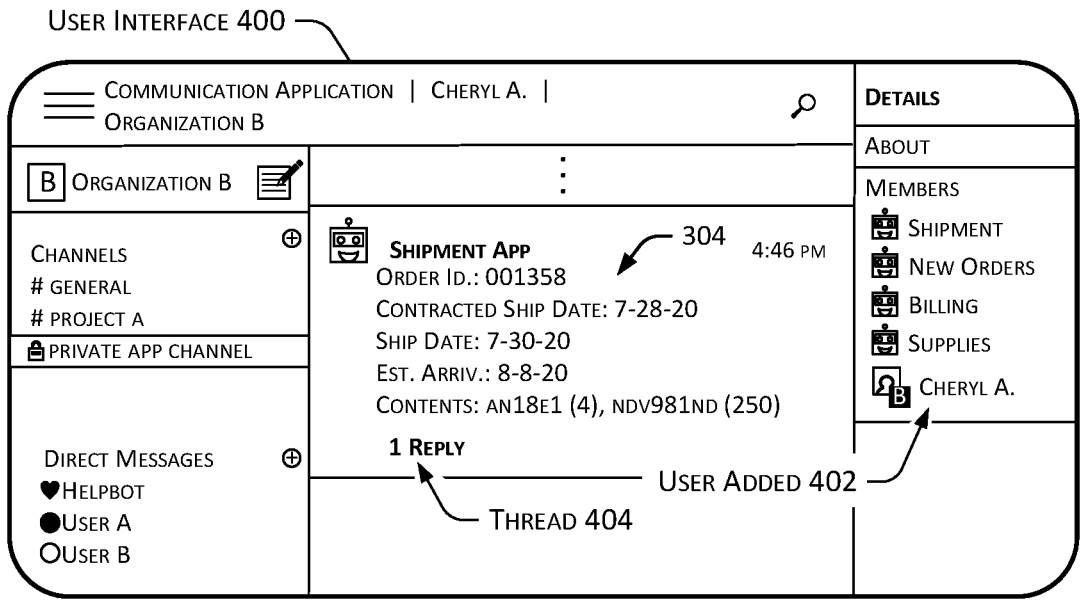
FIGS. 4A-5B illustrate example user interfaces that may result from instructions executed by various components of the group-based communication systems and may further explain underlying operations of those component(s).

FIG. 4A depicts an example user interface 400 that may be displayed based at least in part on operations 310 and/or 314. The action caused by operation 314 may comprise inviting the user to the interchange channel (see 402) and/or opening a thread 404 associated with the message that caused the event detection to trigger. In other words, upon detecting an event associated with message, a workflow may be triggered that invites a user with a role and/or identifier specified by the workflow to the interchange channel and/or creates the thread. The thread may, for example, mention the user and/or include an identifier of the event type, etc., depending on the ruleset associated with the event type that was detected. In some examples, the thread may be created by the group-based communication platform responsive to a request received from the application that detected the event.

FIG. 4A depicts an example user interface 400 that may be displayed based at least in part on operations 310 and/or 314.

Figure 4B:
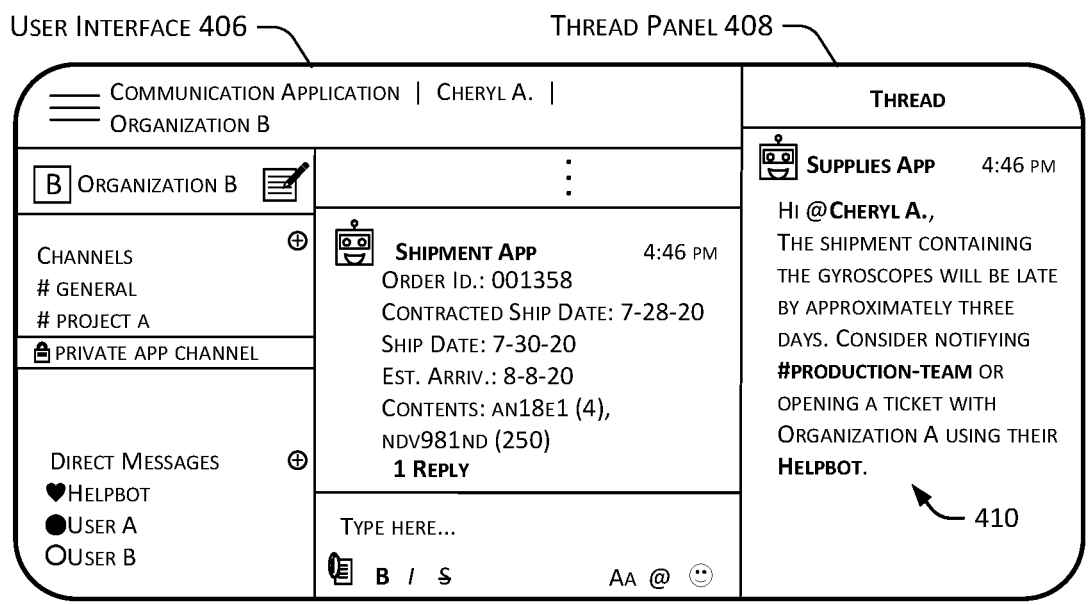

FIG. 4B further illustrates the example discussed in association with FIG. 4A. For example, user interface 406 may be an example of a user interface displayed responsive to selection of the thread indication 404 of user interface 400. In such an example, a thread panel 408 may be displayed comprising the threaded message 410 created by the application that detected the event. The depicted message 410 included an example of the second application's conversion of a portion of the triggering message into simplified text (i.e., "the shipment containing the gyroscopes will be late by approximately three days") and a recommendation (i.e., "consider notifying #production-team or opening a ticket with Organization A using their Helpbot"). Portions of the message 410 may be selectable to cause a transition of the user interface, such as by selecting "#production-team," which may present the contents of another channel and/or an interface for creating a message to send via the #production-team channel, or by selecting "Helpbot" which may open a direct message dialog with a digital assistant associated with the first organization. It is contemplated that these suggestions may vary based at least in part on the event type and may be defined by a user and stored in the ruleset associated with an event type or may be learned by an ML model that tracks subsequent actions of one or more users after they receive a notification of an event.

Figure 5A:
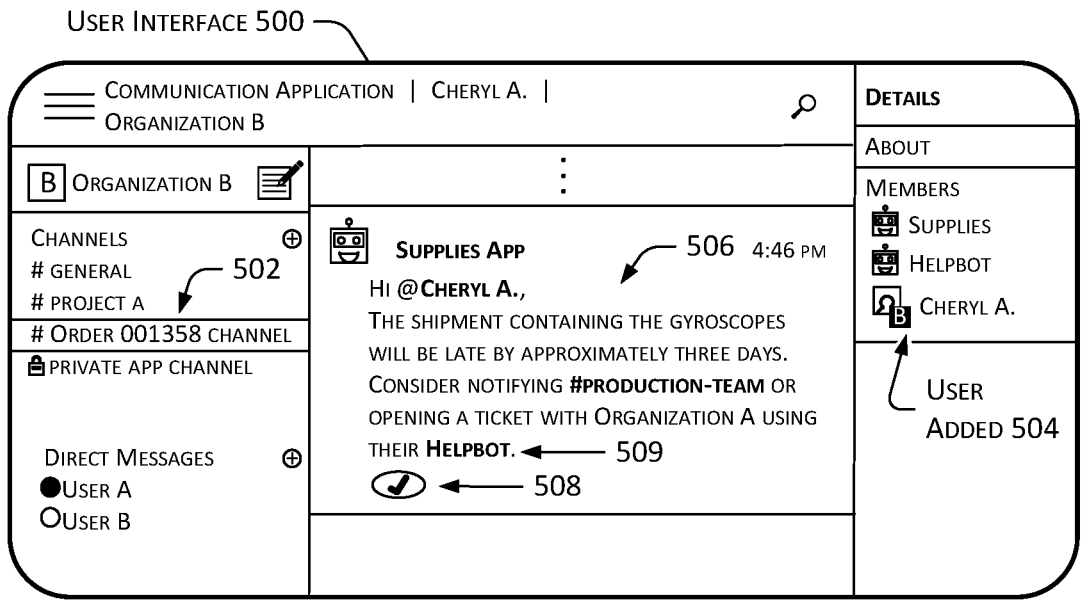

FIG. 5A depicts an example user interface 500 that may be displayed based at least in part on operations 310 and/or 314. The action caused by operation 314 in the illustrated example may comprise opening a new channel 502, adding a user to the new channel 504, and transmitting a message 506 over the channel indicating the event. In some examples, the message transmitted over the channel may additionally or alternatively include a link to the triggering message and/or content associated therewith. FIG. 5A also comprises a reaction 508 to the message 506 selected by the user. In some examples, such a reaction may be used to indicate a status associated with the event (e.g., resolved, work-in-progress, seen, escalated). The reaction 508 or other interactions with the message 506, including metadata associated therewith (e.g., time passed between interactions, time passed since the last interaction) may be used to determine whether or not the event is resolved. Additionally or alternatively, the message transmitted over the channel may include a link or other actuatable element, indicated as bold elements in FIG. 5B, to cause a message to be transmitted to a channel, such as the "#production-team" channel, which may be a channel associated with the second organization, a different organization, or a shared channel, and/or to an application or user associated with a same or different organization, such as the "Helpbot" of the first organization depicted in FIG. 5A at 509.

Note that the application that detected the event may additionally or alternatively add other applications to any of the actions discussed herein. For example, the supplies application may have detected the event in this case and the supplies application may add both the user ("Cheryl A" from Organization B) and the Helpbot of the first organization.

Figure 5B:
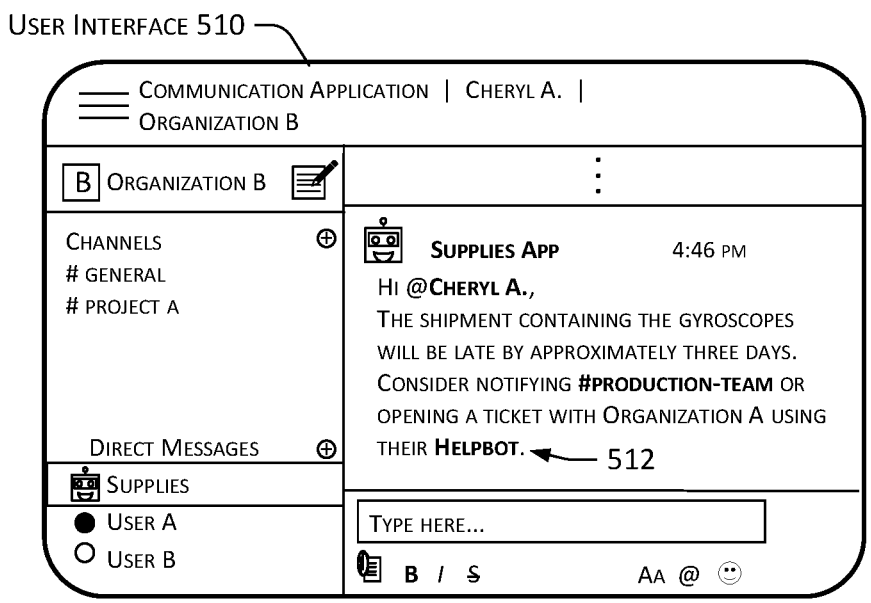

FIG. 5B depicts an example user interface 510 that may be displayed based at least in part on operations 310 and/or 314. The action caused by operation 314 in the illustrated example may comprise transmitting a direct message to a user. For example, the supplies application may transmit a message directly to a user, Cheryl A. In the depicted example, an application associated with the second organization (the "Supplies App" in FIG. 5B) may generate actuatable interface element(s), indicated as bold elements in FIG. 5B, to cause a message to be transmitted to a channel, such as the "#production-team" channel, which may be a channel associated with the second organization, a different organization, or a shared channel, and/or to an application or user associated with a same or different organization, such as the "Helpbot" of the first organization depicted in FIG. 5B at 512.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

What is claimed is:

1. A method, implemented at least in part by one or more computing devices associated with a group-based communication platform, comprising:
   receiving, at the one or more computing devices, a first message from a first application;
   associating, by the one or more computing devices, the first message with a first channel of the group-based communication platform, wherein:
      the associating comprises making the first message available to the first application and a second application via the first channel,
      first permissions associated with the first channel deny users from joining the first channel, and
      the first message comprises a data interchange protocol;
   in response to detecting an event, receiving, from the second application, a request to perform an action in association with the group-based communication platform, wherein the request to perform the action is generated by the second application responsive to detecting the event and comprises instructions to invite a user to the first channel; and
   in response to receiving the request, causing performance of the action, wherein the action comprises inviting the user to the first channel, the user being associated with the group-based communication platform and wherein inviting the user to the first channel comprises modifying permissions associated with the user and the first channel to allow the user to modify content associated with the first channel.

2. The method of claim 1, wherein the action further comprises at least one of:
   transmitting a second message via the first channel, the second message comprising at least one of a link to the first message, a type of the event, content from the first message, metadata, an identifier of the first message, an identifier of the first application, or data received responsive to a service made available by the first application;
   causing execution of a workflow process associated with the group-based communication platform; or
   notifying the user of the event.

3. The method of claim 1, wherein:
   the first application is associated with a first organization; and
   the second application is associated with a second organization different from the first organization.

4. The method of claim 3, wherein:
   the user is a first user associated with the first organization; and
   the method further comprises at least one of:
      inviting a second user associated with the second organization to the first channel,
      creating a second channel and inviting the second user to the second channel, or
      transmitting a message to the first user, the message comprising an actuatable element for causing a message to be sent to the second user.

5. The method of claim 1, further comprising:
   detecting the event based at least in part on a condition that is satisfied by a parameter that matches at least one of data or metadata associated with the first message; and
   in response to detecting the event, causing, by the one or more computing devices, the action to be performed via the group-based communication platform.

6. The method of claim 1, further comprising:
   determining that the event is resolved; and
   in response to determining that the event is resolved, removing the user from the first channel.

7. The method of claim 1, wherein:
   the first application is associated with a first organization of the group-based communication platform;
   the first channel is associated with the first organization;
   the second application is associated with a second organization different from the first organization;
   the method further comprises receiving a request associated with the first organization to add the second application to the first channel; and
   in response to receiving an authorization of the request, setting permissions associated with the first message such that the first message is accessible to the second application.

8. The method of claim 1, wherein the first channel is a private channel that prevents the user from at least one of discovering, joining, or accessing messages associated with the private channel unless and until the user is invited to the first channel.

9. An apparatus comprising:
   one or more processors; and
   a memory storing processor-executable instructions that, when executed by the one or more processors, cause the apparatus to perform operations comprising:
   receiving, at the apparatus, a first message from a first application;
   associating, by the apparatus, the first message with a first channel of a group-based communication platform, wherein the associating comprises making the first message available to the first application and a second application via the first channel and wherein first permissions associated with the first channel deny users from joining the first channel;
   in response to detecting an event, receiving, from the second application, a request to perform an action to be performed in association with the group-based communication platform, wherein the request to perform the action is generated by the second application and comprises instructions to invite a user to the first channel; and
   in response to receiving the request, causing performance of the action, wherein the action comprises inviting the user to the first channel, the user being associated with the group-based communication platform and wherein inviting the user to the first channel comprises modifying permissions associated with the user and the first channel to allow the user to modify content associated with the first channel.

10. The apparatus of claim 9, wherein the action further comprises at least one of:
    transmitting a second message via the first channel, the second message comprising at least one of a link to the first message, a type of the event, content from the first message, metadata, an identifier of the first message, an identifier of the first application, or data received responsive to a service made available by the first application;

causing execution of a workflow process associated with the group-based communication platform; or notifying the user of the event.

11. The apparatus of claim 9, wherein:

the first application is associated with a first organization; and the second application is associated with a second organization different from the first organization.

12. The apparatus of claim 11, wherein:

the user is a first user associated with the first organization; and the operations further comprises at least one of:

inviting a second user associated with the second organization to the first channel, creating a second channel and inviting the second user to the second channel, or transmitting a message to the first user, the message comprising an actuatable element for causing a message to be sent to the second user.

13. The apparatus of claim 9, wherein the operations further comprise:

determining that the event is resolved; and in response to determining that the event is resolved, removing the user from the first channel.

14. The apparatus of claim 9, wherein:

the first application is associated with a first organization of the group-based communication platform;

the first channel is associated with the first organization;

the second application is associated with a second organization different from the first organization;

the operations further comprise:

receiving a request associated with the first organization to add the second application to the first channel; and in response to receiving an authorization of the request, setting permissions associated with the first message such that the first message is accessible to the second application.

15. A non-transitory computer-readable medium storing computer-executable instructions that, when executed by one or more processors, cause the one or more processors to perform operations comprising:

receiving, at the one or more processors, a first message from a first application;

associating, by the one or more processors, the first message with a first channel of a group-based communication platform, wherein the associating comprises making the first message available to the first application and a second application via the first channel and wherein first permissions associated with the first channel deny users from joining the first channel;

in response to detecting an event, receiving, from the second application, a request to perform an action to be performed in association with the group-based communication platform, wherein the request to perform the action is generated by the second application; and in response to receiving the request, causing performance of the action, wherein the action comprises transmitting, in a direct message to a user, a portion of content associated with the first channel.

16. The non-transitory computer-readable medium of claim 15, wherein the action further comprises at least one of:

transmitting a second message via the first channel, the second message comprising at least one of a link to the first message, a type of the event, content from the first message, metadata, an identifier of the first message, an identifier of the first application, or data received responsive to a service made available by the first application;

causing execution of a workflow process associated with the group-based communication platform; or notifying the user of the event.

17. The non-transitory computer-readable medium of claim 15, wherein:

the first application is associated with a first organization; and the second application is associated with a second organization different from the first organization.

18. The non-transitory computer-readable medium of claim 17, wherein:

the user is a first user associated with the first organization; and the operations further comprises at least one of:

inviting a second user associated with the second organization to the first channel, creating a second channel and inviting the second user to the second channel, or transmitting a message to the first user, the message comprising an actuatable element for causing a message to be sent to the second user.

19. The non-transitory computer-readable medium of claim 17, further comprising:

transmitting a notification to the user, the notification indicating a second action taken by the second application responsive to the event.

20. The non-transitory computer-readable medium of claim 19, wherein the notification additionally indicates a third action taken by a second user associated with the second organization.

* * * * *